United States Patent [19]
Menke et al.

[11] Patent Number: 5,716,127
[45] Date of Patent: Feb. 10, 1998

[54] SIGNAL LIGHT HOUSING

[75] Inventors: W. Kenneth Menke; W. Kenneth Menke, III, both of Glendale, Mo.

[73] Assignee: The Fire Products Company, Webster Groves, Mo.

[21] Appl. No.: 560,464

[22] Filed: Nov. 17, 1995

[51] Int. Cl.⁶ .................................................. B60Q 9/00
[52] U.S. Cl. ...................... 362/307; 362/362; 362/376
[58] Field of Search .......................... 362/35, 307, 310, 362/311, 362, 374, 375, 376, 80, 83.3

[56] References Cited

U.S. PATENT DOCUMENTS

| | | |
|---|---|---|
| 4,701,743 | 10/1987 | Pearlman et al. . |
| 4,924,209 | 5/1990 | Kao ............................. 362/83 |
| 4,931,768 | 6/1990 | Jincks et al. .................. 362/35 |
| 5,057,985 | 10/1991 | Kreutzer, Jr. et al. . |
| 5,091,828 | 2/1992 | Jincks et al. . |
| 5,097,397 | 3/1992 | Stanuch et al. . |
| 5,150,959 | 9/1992 | Paffrath et al. ............... 362/80 |
| 5,311,414 | 5/1994 | Branham, Sr. ............... 362/374 |
| 5,385,062 | 1/1995 | Menke . |

FOREIGN PATENT DOCUMENTS 2260397  4/1993  United Kingdom ................... 362/307

*Primary Examiner*—Ira S. Lazarus
*Assistant Examiner*—Sara Sachie Raab
*Attorney, Agent, or Firm*—Howell & Haferkamp, L.C.

[57] ABSTRACT

A signal light housing is comprised of three basic component parts; a back plate, a mounting plate and a lens cover. The back plate is provided with a substantially flat exterior surface to enable the signal light housing to be mounted flush against the exterior surface of a vehicle. The lens cover encloses an interior volume of the housing and can be removed from the housing without removing the housing from the vehicle surface. The mounting plate is removably attached to the back plate and provides a sufficient area to support a variety of different types of signal light assemblies thereon within the interior volume of the housing. The mounting plate is easily removed from the back plate to remove a defective signal light assembly from the housing, and enable its replacement with an operative signal light assembly attached on a like mounting plate.

18 Claims, 4 Drawing Sheets

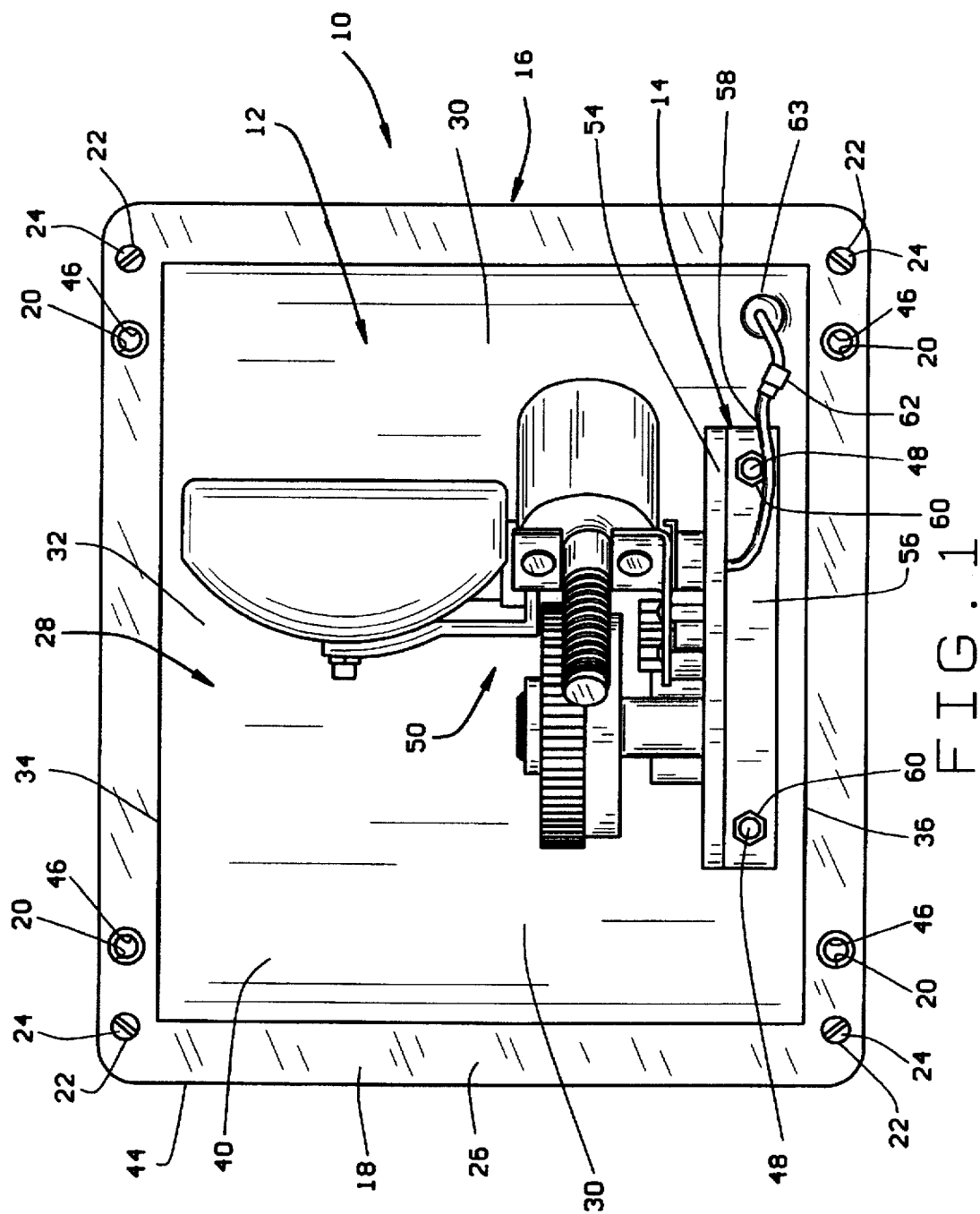

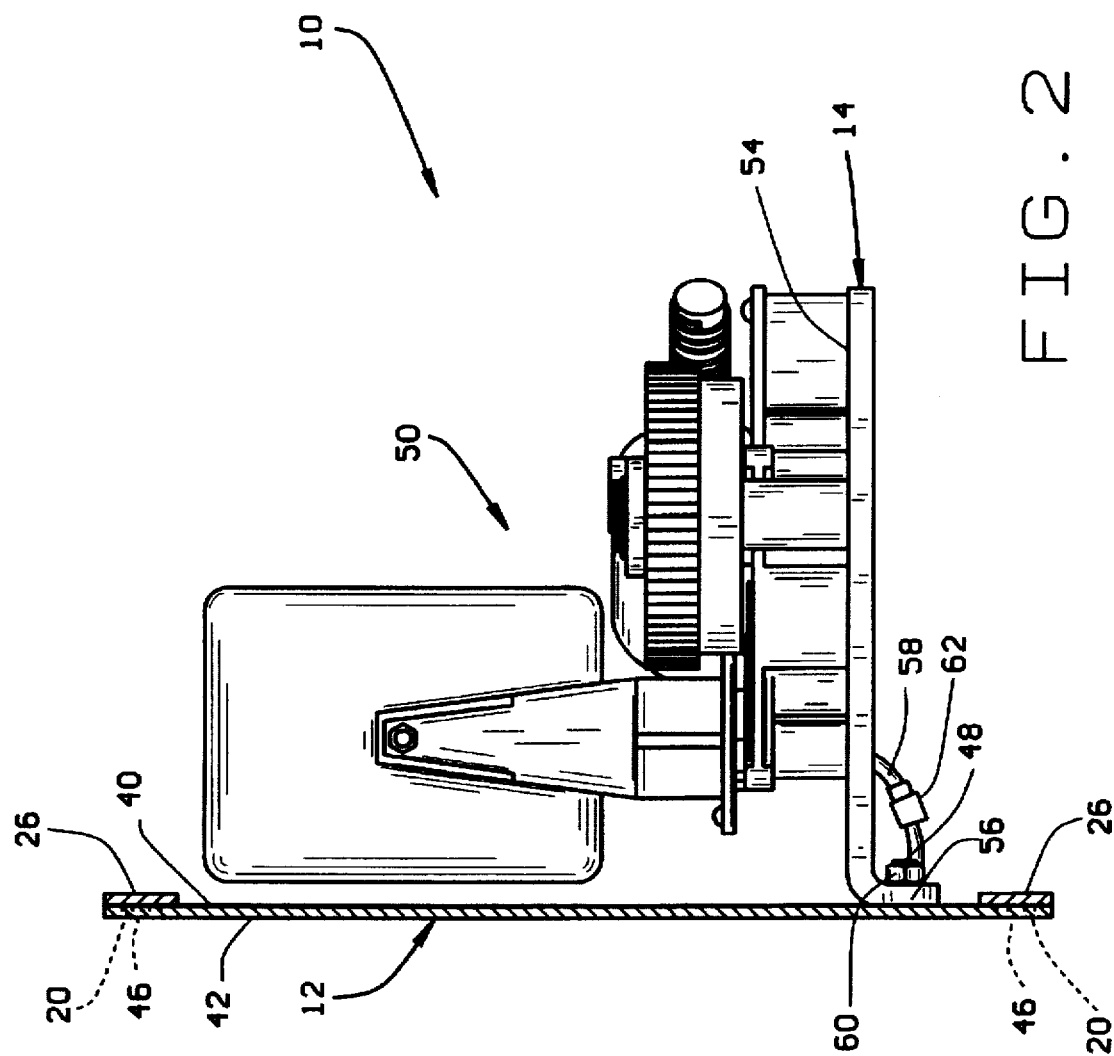

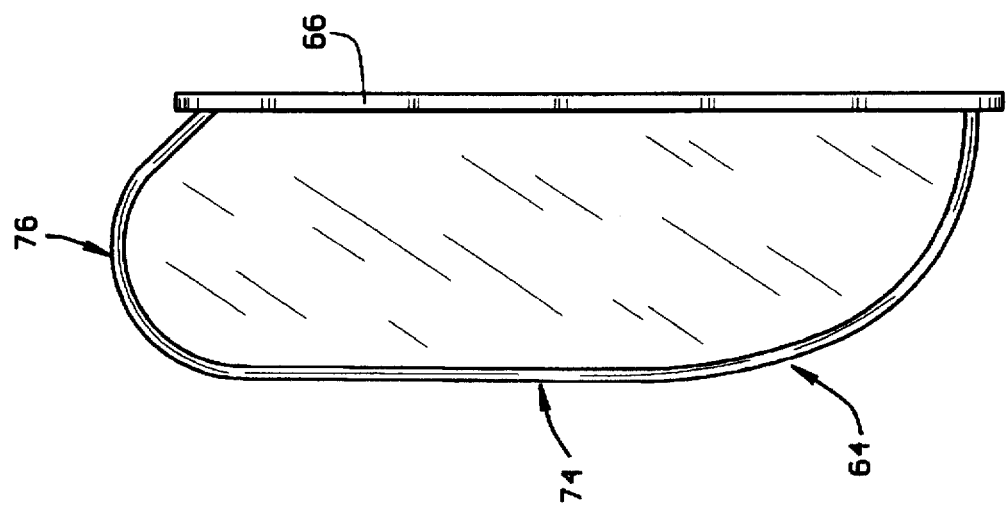
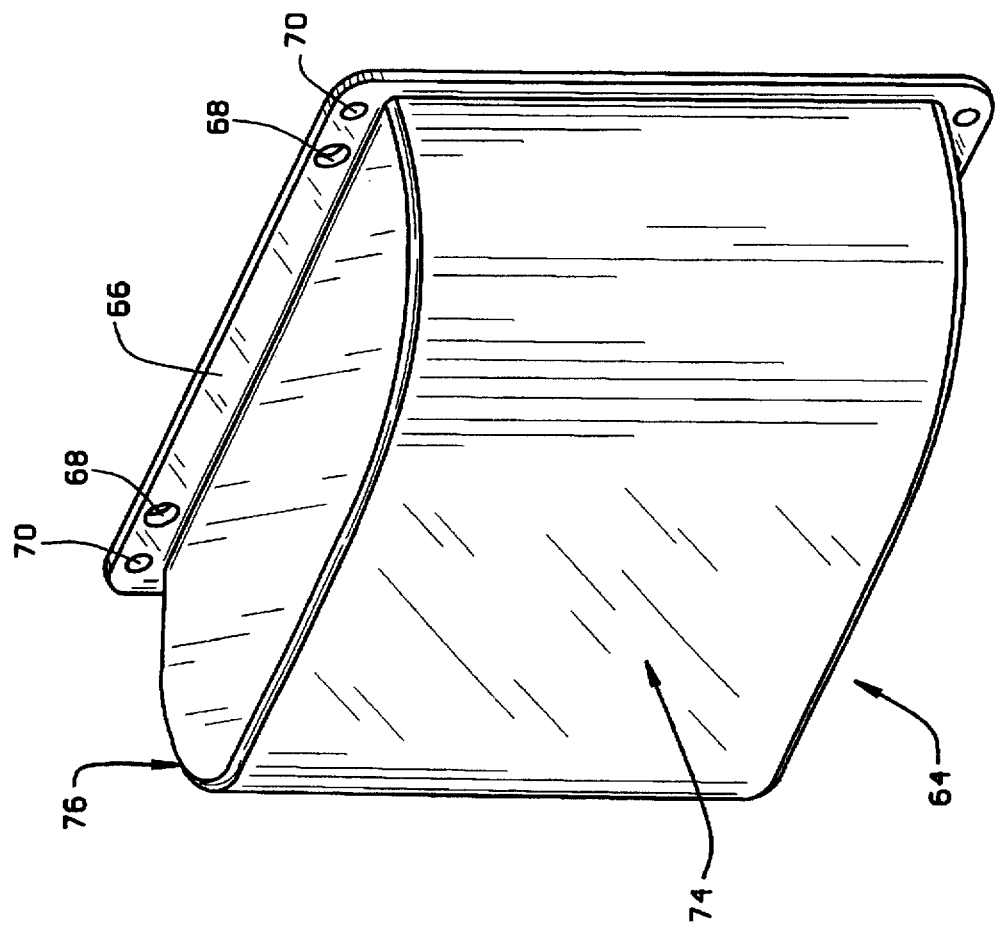

SIGNAL LIGHT HOUSING

BACKGROUND OF THE INVENTION

(1) FIELD OF THE INVENTION

The present invention relates to signal lights of the type used on emergency vehicles. More particularly, the present invention relates to a signal light housing which provides for easy installation and replacement of components of the signal light.

(2) DESCRIPTION OF THE RELATED ART

Signal lights are used primarily on emergency and service vehicles such as police, fire department and road maintenance vehicles. They have also been used on other types of vehicles and in other applications where it is desired to attract attention. Frequently, at least some signal lights are mounted on vertical surfaces along the front, side and rear of the vehicles.

In mounting prior art signal lights to vehicles, it is often necessary to cut a large hole through the exterior surface of the vehicle to accommodate the signal light housing. This is because it is often necessary to position a significant portion of the signal light housing beneath the surface of the vehicle on which it is being mounted. In some situations the hole cut in the vehicle surface must have a specific shape and size to properly mount a particular signal light housing in the hole. The time involved in properly positioning and dimensioning the hole in the vehicle surface contributes significantly to the expense of mounting prior art signal lights on vehicles.

Where signal lights are mounted on the vertical surfaces of emergency vehicles, the vehicle itself often obstructs the view of the light when observed from many angles. For instance, a light mounted on a rear surface may be viewed through an arc of only 180°. Thus, the light would not be visible from the front of the vehicle and might even be obscured to the side of the vehicle. Even when the light is mounted adjacent a corner, this observability angle is not significantly increased. As a result, numerous lights must be placed around the vehicle which increases the costs due to additional hardware and installation expenses. In addition, operation and repair expenses are increased with the addition of more signal lights.

SUMMARY OF THE INVENTION

The present invention overcomes disadvantages typically associated with prior art signal light housings by providing an improved signal light housing that requires only minimum penetration of the vehicle exterior surface in mounting the housing. The signal light housing is also removable from the vehicle surface as a single unit, which enhances replacement and repair. The housing has a back plate which is configured to reduce the modification required of the emergency vehicle for installation, and provides a low profile to improve the aerodynamic characteristics of the housing. Further, in an alternate embodiment, the lens of the housing is configured so that it may be viewed through an area of greater than 180° and from around a corner of an emergency vehicle.

BRIEF DESCRIPTION OF THE DRAWINGS

Further objects and features of the present invention are revealed in the following Detailed Description of the Preferred Embodiment of the invention and in the drawing figures wherein:

FIG. 1 is a front elevation view of the signal light housing;

FIG. 2 is a left side elevation view of the signal light housing with the lens removed;

FIG. 5 is a perspective view of a lens of a second embodiment; and

FIG. 6 is a top plan view of the lens of the second embodiment.

DETAILED DESCRIPTION OF THE PREFERRED EMBODIMENT

Figure 4:
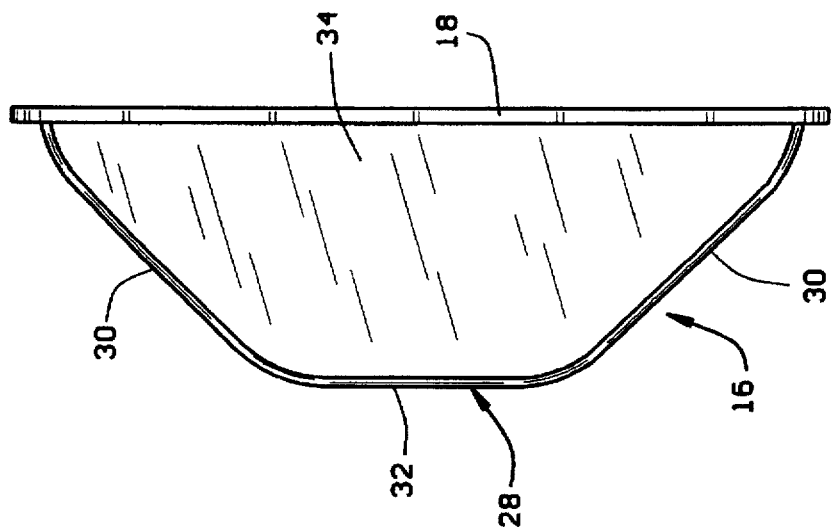
FIG. 4 is a top plan view of the lens of the first embodiment.

FIG. 1 shows the assembled signal light housing 10 of the present invention. The housing is basically comprised of a back plate 12, a mounting plate 14, and a lens cover 16. As seen in FIG. 1, the mounting plate 14 is assembled to the back plate 12 and is contained in an interior volume of the housing between the lens cover 16 and the back plate.

In the preferred embodiment of the invention, the lens cover 16 is constructed of a transparent plastic. The plastic can have a colored tint such as red, yellow or blue, or can be clear as is typical in prior art lens covers of emergency vehicles. The lens cover is formed with a substantially flat peripheral flange 18 that extends completely around the lens cover. Two pairs of mounting holes 20 pass through the flange, one pair along the top of the flange and one pair along the bottom of the flange. Two pairs of fastener holes 22 also pass through the flange, with one pair at the top of the flange and one pair at the bottom of the flange. The fastener holes are slightly smaller than the mounting holes 20. The fastener holes receive connectors such as threaded fasteners 24 that attach the lens cover 16 to the back plate 12. The threaded fasteners 24 engage in threaded holes (not shown) in the back plate 12 to fasten the lens cover 16 to the back plate. Preferably, a gasket 26 is positioned between the back plate and lens cover. The mounting holes are used to mount the entire signal light housing to a separate surface, as will be explained.

In the embodiment of the lens cover described, the flange 18 surrounds the periphery of the lens. However, it is not necessary that the flange project from the periphery of the lens as the flange shown in the drawings. It is only necessary that the flange have a surface that engages against the back plate 12 when assembling the lens cover 16 to the back plate. Therefore, "flange" as used herein should be interpreted as such a surface.

Figure 3:
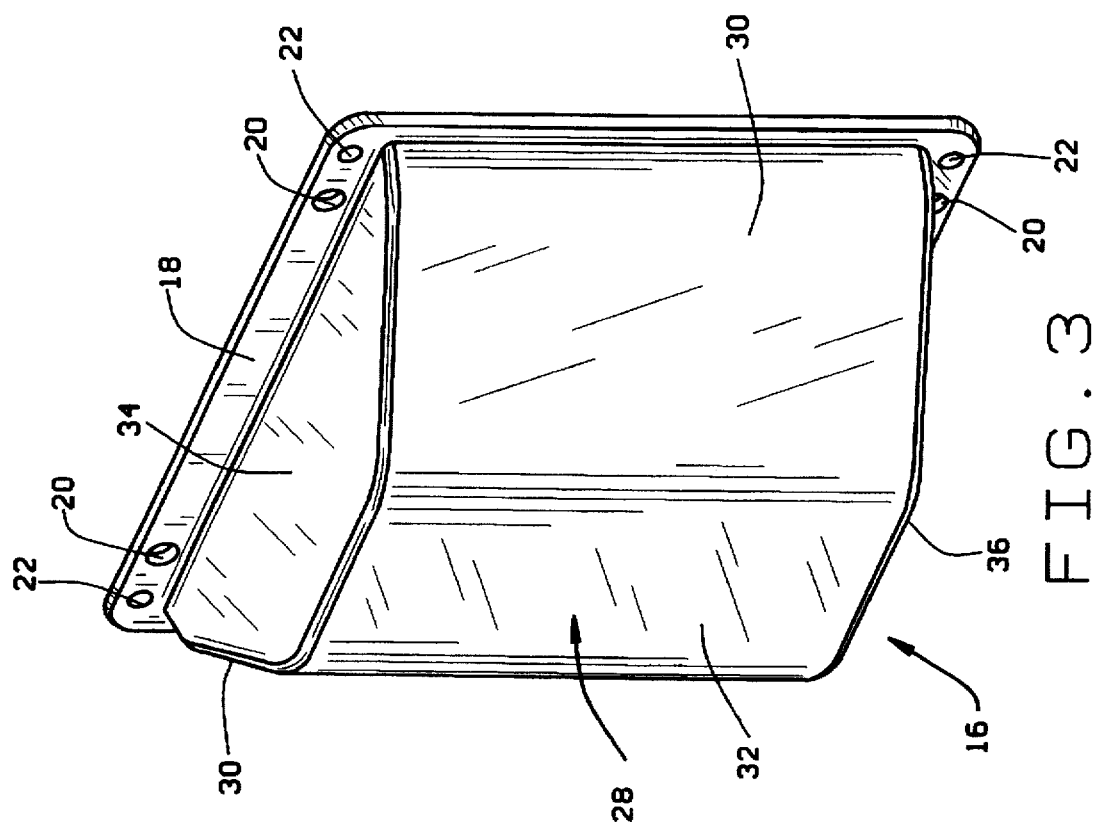
FIG. 3 is a perspective view of a lens of a first embodiment.

A center panel 28 of the lens cover extends outwardly from the peripheral flange 18. The center panel 28 is best seen in FIGS. 3 and 4. As shown in these drawing figures, the center panel 28 projects outwardly from the plane of the lens cover flange 18. The panel is basically comprised of two angled surfaces 30 and a center surface 32 that is substantially parallel to the plane of the peripheral flange 18. One of the angled surfaces 30 is preferably positioned facing forward on the vehicle on which the signal light housing is installed, thereby providing an aerodynamic, low profile to the housing. The panel also includes top and bottom surfaces 34, 36 that are substantially perpendicular to the plane of the flange 18. The lens cover 16 is preferably molded as a single unit and provides a sealed enclosure within the interior volume of the signal light housing 10 for a signal light assembly.

The back plate 12 may be constructed of metal or a plastic. As shown in FIGS. 1 and 2, in the illustrative embodiment of the invention, the back plate has a rectangular configuration. The plate is provided with opposite interior 40 and exterior 42 surfaces. The exterior surface 42 of the back plate is completely flat to facilitate its attachment flush to a separate planar surface of a vehicle. However, in other applications the back plate could have other configurations to adapt it to mounting on any particular surfaces. The peripheral edge 44 of the back plate is dimensioned to correspond to the peripheral edge of the lens cover flange 18. Adjacent the peripheral edge 44 are two pairs of mounting holes 46. One pair of mounting holes is provided adjacent the top of the peripheral edge and one pair of mounting holes is provided adjacent the bottom of the peripheral edge. The mounting holes 46 are slightly smaller than, but concentrically aligned with, the mounting holes 20 of the lens cover 16. This positioning of the back plate mounting holes 46 enables threaded fasteners to be passed through the larger mounting holes 20 of the lens cover 16 and through the smaller mounting holes 46 of the back plate 12 to attach the signal light housing 10 as a single unit to a separate planar surface. The larger mounting holes 20 of the lens cover 16 permit the lens cover to be removed from the back plate 12 when the back plate is attached to the separate planar surface by removing the threaded fasteners 24 attaching the lens cover to the back plate. The larger lens cover mounting holes 20 permit these holes to be passed over the heads of the fasteners employed in the back plate mounting holes 46 attaching the signal light housing to the separate planar surface.

A pair of threaded studs 48 project outwardly from the back plate interior surface 40 adjacent its bottom. The studs 48 are provided on the back plate to removably mount the mounting plate 14 to the interior surface 40 of the back plate, as will be described. With the lens cover 16 attached to the interior surface 40 of the back plate, the configuration of the lens cover center panel 28 encloses an interior volume between the lens cover and back plate that is sufficiently large to accommodate the mounting plate 14 and a signal light mechanism 50 supported on the mounting plate without the lens cover contacting the mounting plate.

The mounting plate 14 has a top planar support section 54 and a downwardly angled flange 56. The support section 54 is dimensioned sufficiently large to accommodate a signal light assembly 50 thereon. The signal light assembly 50 shown in the drawing figures is exemplary only, and various different types of signal light assemblies may be employed with the signal light housing 10 of the invention. As best seen in FIG. 2, the mounting plate support section 54 projects perpendicularly from the interior surface 40 of the back plate a sufficient distance to space the signal light assembly 50 from the interior surface of the back plate.

The mounting plate flange 56 has a pair of holes passing therethrough that are dimensioned and spaced from each other to receive the pair of back plate threaded studs 48. In attaching the mounting plate to the interior surface of the back plate, the threaded studs 48 are inserted through the pair of holes in the mounting plate flange 56. A pair of hex nuts 60 are then screw threaded on the studs 48 to removably attach the mounting plate 14 to the interior surface of the back plate.

The mounting plate support section 54 has a hole (not shown) passing therethrough to permit the passage of the electrical wiring 58 of the signal light assembly. A quick disconnect plug 62 is provided on the wiring. The wiring 58 passes through the hole in the support section 54 and then through a hole 63 provided for the wiring in the back plate 12. Additional holes may be provided through the support section 54 of the mounting plate to enable the attachment of the signal light assembly 50 thereon. The number and positioning of these holes will change depending on the particular type of light assembly employed in the signal light housing 10.

It can be seen that the signal light assembly 50 is solely supported by the mounting plate 14. By removing the mounting plate 14 from the interior surface 40 of the back plate 12 and disconnecting the plug 62, the entire signal light assembly may be easily removed from the back plate. This facilitates the servicing of the signal light assembly in the signal light housing 10. With this particular arrangement of removably attaching the mounting plate 14 to the back plate 12, should a problem with the signal light assembly 50 occur, the entire assembly can be easily replaced by simply removing the mounting plate 14 with the signal light assembly attached and replacing it with a like mounting plate 14 having an operational signal light assembly attached. It can be appreciated that this ability to quickly remove a defective signal light assembly from the housing will significantly decrease the down time of the signal light when it requires servicing.

The lens cover shown in FIGS. 3 and 4 is designed to permit viewing of an oscillating signal light assembly contained in the housing 10 from any line of sight on one side of the lens cover flange. This configuration of the lens cover 16 is principally designed for use on the side of a vehicle where the signal light assembly contained in the housing can be viewed from substantially any position at the side of the vehicle on which the housing is attached.

The lens cover 64 shown in FIGS. 5 and 6 is designed to replace the previously described lens cover 16 shown in FIGS. 3 and 4. This second embodiment of the lens cover 64 is designed to be seen from substantially any position at the side of the vehicle surface to which it is attached, but is also designed to be visible around a corner of the vehicle when the signal light housing 10 with the second embodiment of the lens cover 64 attached is mounted to the vehicle surface adjacent a corner of the vehicle surface.

Like the previously described embodiment of the lens cover, the second embodiment of the lens cover 64 also includes a peripheral flange 66 that extends completely around the lens cover. The flange 66 is dimensioned in the identical manner as the flange 18 of the previously described embodiment of the lens cover. It also has two pairs of mounting holes 68 and two pairs of fastener holes 70 positioned on the flange in the same manner as the previously described embodiment. These holes mount the signal light housing to a separate planar surface just as in the previously described embodiment, and also receive fasteners for mounting the lens cover 64 to the back plate 12 in the same manner as the previously described embodiment.

The center panel 74 of the lens cover 64 is shaped differently than the previously described embodiment and is provided with a lobed section 76 that projects over and beyond the peripheral flange 66 of the lens cover. It can be seen that by mounting the signal light housing 10 adjacent the corner of a vehicle surface where the lobed section 76 of the lens cover 64 projects beyond the corner of the vehicle surface, the lobed section 76 will be observable from a position around the corner of the vehicle surface. This enables the signal light assembly 50 within the housing 10 to be observable not only from positions at the side of the vehicle surface to which the housing is attached, but also from positions around a corner of the vehicle surface beyond which the lobed section 76 of the lens cover 64 projects.

The signal light housing 10 of the present invention may be easily installed on a vehicle surface with only minimum penetration of the vehicle surface. The signal light housing is specifically designed to be installed on the vehicle surface as a single unit. The housing is preassembled containing a signal light assembly 50 with the wiring 58 and one part of the electrical disconnect plug 62 projecting from the wiring hole in the back plate. The surface of the vehicle on which the signal light housing is to be attached is prepared by first drilling a hole through the surface for the electrical wiring to power the signal light assembly to pass through. The wiring is installed in the vehicle and is passed through the drilled hole in the exterior surface of the vehicle extending to the complimentary half of the electrical plug 62. The half of the electrical plug connected to the wiring extending from the hole in the vehicle surface is connected to the other half of the plug extending through the hole in the back plate 12 of the signal light housing 10. The excess wire is then fed through the hole in the back plate 12. The signal light housing is then placed in its desired orientation and positioned against the exterior surface of the vehicle. A drill is then inserted through the mounting holes 20 of the lens cover and the mounting holes 46 of the back plate and holes are drilled to receive threaded fasteners that will hold the signal light housing to the exterior surface of the vehicle. In the manner, the signal light housing 10 of the present invention can be easily installed on the exterior surface of a vehicle without requiring any disassembly of the signal light housing.

Should servicing of the signal light housing 10 or signal light assembly 50 be required, the signal light housing 10 in its entirety may be removed by simply removing the fasteners received in the lens cover and back plate mounting holes 20, 46 holding the housing to the vehicle surface. The entire signal light housing 10 may then be removed for servicing or replaced with a like light housing. Alternatively, the lens cover 16 may be removed by removing the threaded fasteners 24. The defective signal light assembly 50 may then be removed by removing the entire mounting plate 14 from the back plate. The defective signal light can then be replaced with a like signal light assembly mounted on a like mounting plate.

While the present invention has been described by reference to a specific embodiment, it should be understood that modifications and variations of the invention may be constructed without departing from the scope of the invention defined in the following claims.

What is claimed is:

1. A signal light housing having an interior for containing a signal light assembly, the housing comprising:

a back plate having opposite interior and exterior surfaces;

a lens cover secured to the back plate over the interior surface of the back plate and enclosing an interior volume of the housing between the lens cover and the back plate; and, a mounting plate removably attached to the interior surface of the back plate at an angled orientation relative to the interior surface, the mounting plate being configured to support a signal light assembly solely on the mounting plate whereby the signal light assembly is removable from the back plate by removing the mounting plate from the back plate.

2. The signal light housing of claim 1, wherein:

the exterior surface of the back plate is configured to adapt the exterior surface for flush attachment to a separate surface.

3. The signal light housing of claim 1, wherein:

the back plate and the lens cover have pluralities of aligned mounting holes extending therethrough, the pluralities of aligned mounting holes are dimensioned to receive fasteners for attaching the signal light housing to a separate surface.

4. The signal light housing of claim 3, wherein:

a plurality of fasteners secure the lens cover to the back plate, the plurality of fasteners are separated from the mounting holes.

5. The signal light housing of claim 1, wherein:

the mounting plate projects perpendicularly outwardly from the interior surface of the back plate a sufficient distance to space a signal light assembly mounted on the mounting plate outwardly from the interior surface of the back plate.

6. The signal light housing of claim 1, wherein:

the lens cover is secured only to the back plate and is not secured to the mounting plate.

7. The signal light housing of claim 1, wherein:

the lens cover has a peripheral flange that is secured flush against the interior surface of the back plate and the lens cover has a transparent center panel, the center panel projects outwardly from the back plate around the mounting plate.

8. The signal light housing of claim 7, wherein:

a portion of the center panel projects over and overlaps a portion of the flange.

9. A signal light housing having an interior for containing a signal light assembly, the housing comprising:

a back plate having opposite interior and exterior surfaces and mounting holes extending therethrough;

a lens cover positioned over the interior surface of the back plate and enclosing an interior volume of the signal light housing between the lens cover and the back plate, the lens cover having mounting holes extending therethrough, the lens cover mounting holes and back plate mounting holes being aligned to receive fasteners therethrough for attaching the signal light housing to a separate surface; and a plurality of connectors attach the lens cover to the back plate, the plurality of connectors are spaced from the lens cover mounting holes and the back plate mounting holes.

10. The signal light housing of claim 9, wherein:

the plurality of connectors include connector holes on the lens cover spaced from the lens cover mounting holes, and concentric threaded holes in the back plate interior surface that align with the connector holes and receive threaded fasteners to attach the lens cover to the back plate.

11. A signal light housing having an interior for containing a signal light assembly, the housing comprising:

a back plate having opposite interior and exterior surfaces and mounting holes extending therethrough;

a lens cover positioned over the interior surface of the back plate and enclosing an interior volume of the signal light housing between the lens cover and the back plate, the lens cover having mounting holes extending therethrough, the lens cover mounting holes and back plate mounting holes being aligned to receive fasteners therethrough for attaching the signal light housing to a separate surface;

the back plate has a peripheral edge;

the lens cover has a peripheral flange that is attached to the interior surface of the back plate, and the lens cover has a transparent center panel that projects outwardly from the lens cover flange and the back plate interior surface.

12. The signal light housing of claim 11, wherein:

a portion of the center panel projects over and overlaps the back plate peripheral edge.

13. A signal light housing having an interior for containing a signal light assembly, the housing comprising:

a back plate having opposite interior and exterior surfaces and mounting holes extending therethrough;

a lens cover positioned over the interior surface of the back plate and enclosing an interior volume of the signal light housing between the lens cover and the back plate, the lens cover having mounting holes extending therethrough, the lens cover mounting holes and back plate mounting holes being aligned to receive fasteners therethrough for attaching the signal light housing to a separate surface; and the back plate has a peripheral edge and the exterior surface is substantially flat within the peripheral edge.

14. A signal light housing having an interior for containing a signal light assembly, the housing comprising:

a back plate having opposite interior and exterior surfaces and mounting holes extending therethrough;

a lens cover positioned over the interior surface of the back plate and enclosing an interior volume of the signal light housing between the lens cover and the back plate, the lens cover having mounting holes extending therethrough, the lens cover mounting holes and back plate mounting holes being aligned to receive fasteners therethrough for attaching the signal light housing to a separate surface; and a mounting plate projects outwardly from the interior surface of the back plate, the mounting plate is oriented at an angle relative to the back plate and is configured to support a signal light assembly on the mounting plate.

15. The signal light assembly of claim 14, wherein:

the mounting plate is removably attached to the back plate whereby a signal light assembly supported on the mounting plate is removable from the back plate by removing the mounting plate from the back plate.

16. A signal light housing having an interior volume for containing a signal light assembly, the housing comprising:

a back plate having a peripheral edge and opposite interior and exterior surfaces, the exterior surface of the back plate is configured to adapt the exterior surface for flush attachment to a separate surface; and, a lens cover secured to the interior surface of the back plate and enclosing an interior volume of the signal light housing; and a mounting plate is removably attached to the interior surface of the back plate at an angled orientation relative to the interior surface, the mounting plate is configured to support a signal light assembly solely on the mounting plate whereby removing the mounting plate from the back plate removes the signal light assembly from the back plate.

17. The signal light housing of claim 16, wherein:

the back plate has plurality of mounting holes extending therethrough and the lens cover has a plurality of mounting holes extending therethrough that are aligned with the back plate mounting holes to receive fasteners therethrough for attaching the signal light housing to a separate surface.

18. The signal light housing of claim 17, wherein:

a plurality of connectors attach the lens cover to the back plate, the plurality of connectors are spaced from the lens cover mounting holes and the back plate mounting holes.

* * * * *